US011451511B1

(12) United States Patent
Lakshmanan et al.

(10) Patent No.: US 11,451,511 B1
(45) Date of Patent: Sep. 20, 2022

(54) AUDIO-BASED SYSTEMS, DEVICES, AND METHODS FOR DOMAIN SERVICES

(71) Applicant: VERISIGN, INC., Reston, VA (US)

(72) Inventors: Ashvatth Lakshmanan, Falls Church, VA (US); Karthik Shyamsunder, Winchester, VA (US); Hari Sola, Ashburn, VA (US)

(73) Assignee: VeriSign, Inc., Reston, VA (US)

( * ) Notice: Subject to any disclaimer, the term of this patent is extended or adjusted under 35 U.S.C. 154(b) by 446 days.

(21) Appl. No.: 15/805,569

(22) Filed: Nov. 7, 2017

(51) Int. Cl.
| *H04L 61/4511* | (2022.01) |
| *H04L 61/3015* | (2022.01) |
| *G10L 15/22* | (2006.01) |
| *G10L 15/26* | (2006.01) |

(52) U.S. Cl.
CPC .......... *H04L 61/3025* (2013.01); *G10L 15/22* (2013.01); *G10L 15/26* (2013.01); *H04L 61/4511* (2022.05)

(58) Field of Classification Search
CPC .............. H04L 61/1511; H04L 61/302; H04L 61/3025; H04L 61/2007; H04L 29/12066; H04L 29/12641; H04L 61/6004
See application file for complete search history.

(56) References Cited

U.S. PATENT DOCUMENTS

| 6,999,932 | B1 * | 2/2006 | Zhou | G06F 40/289 |
| | | | | 704/277 |
| 2005/0102354 | A1 * | 5/2005 | Hollenbeck | G06Q 10/02 |
| | | | | 709/203 |
| 2008/0005127 | A1 * | 1/2008 | Schneider | H04L 29/12594 |
| 2010/0114944 | A1 * | 5/2010 | Adler | G10L 15/22 |
| | | | | 707/770 |
| 2012/0084281 | A1 * | 4/2012 | Colosi | H04L 29/12641 |
| | | | | 707/723 |
| 2015/0269646 | A1 * | 9/2015 | Borges | G06Q 30/0627 |
| | | | | 705/26.63 |
| 2016/0260430 | A1 * | 9/2016 | Panemangalore | G10L 15/1822 |
| 2017/0331786 | A1 * | 11/2017 | Lai | G06F 40/129 |
| 2018/0026935 | A1 * | 1/2018 | Ripke | H04L 67/568 |
| | | | | 709/213 |
| 2018/0287883 | A1 * | 10/2018 | Joshi | G06F 9/45558 |

* cited by examiner

*Primary Examiner* — Hitesh Patel
(74) *Attorney, Agent, or Firm* — Baker Botts L.L.P.; Michael A. Sartori

(57) ABSTRACT

A system receives, at a translation device, a first domain name service request. The first domain name service request is from a voice-based communication device receives an audible request. The translation device translates the first domain name service request into a format recognizable by a service provider and then subsequently transmits the translated first domain name service request to the service provider. The service provider may perform a first domain name service in response to the translated first domain name service request to produce first domain name service information. The system may transmit the first domain name service information from the service provider to the translation device, which translates the first domain name service information into a format recognizable by the voice-based communication device and then subsequently transmits the translated first domain name service information to the voice-based communication device.

23 Claims, 4 Drawing Sheets

AUDIO-BASED SYSTEMS, DEVICES, AND METHODS FOR DOMAIN SERVICES

BACKGROUND

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com.

The responsibility for operating each TLD, including maintaining a registry of the second-level domains within the TLD, can be delegated to a particular organization, known as a domain name registry ("registry"). The registry is primarily responsible for answering queries for IP addresses associated with domains ("resolving"), typically through DNS servers that maintain such information in large databases, and operating its top-level domain.

In some instances, in order to obtain a domain name, that domain name is registered with a registry through a domain name registrar, an entity accredited by the Internet Corporation for Assigned Names and Numbers (ICANN) and authorized to register Internet domain names on behalf of end-users.

Currently, to register a domain name, a user must first determine whether the domain name is available for registration or already registered (e.g., by another user). To accomplish this, the user manually performs a search for a web site/service that will allow the user to search a registry to determine whether the domain name is available or already registered. Once the web site/service is located, the user then manually performs the search for the domain name using the website/service. If the domain name is available, the user may manually enter the required information and payment to register the domain name. As will be appreciated, each of these steps requires the user to manually type and view information on a computer or smart device. Accordingly, improved systems and methods for identifying and registering available domain names that solve the drawbacks and problems of the current systems and methods would be desirable.

SUMMARY

A system for providing domain name services is disclosed. The system includes a processing system including one or more processors. The system also includes a memory system including one or more computer-readable media. The one or more computer-readable media contain instructions that, when executed by the processing system, cause the processing system to perform operations. The operations include receiving, at a translation device, a first domain name service request from a voice-based communication device that receives an audible request. The translation device translates the first domain name service request into a format recognizable by a service provider and then subsequently transmits the translated first domain name service request to the service provider. The operations also include performing, by the service provider, a first domain name service in response to the translated first domain name service request to produce first domain name service information. The operations also include transmitting the first domain name service information from the service provider to the translation device, which translates the first domain name service information into a format recognizable by the voice-based communication device and then subsequently transmits the translated first domain name service information to the voice-based communication device.

In another embodiment, the system may include a processing system including one or more processors. The system also includes a memory system including one or more computer-readable media. The one or more computer-readable media contain instructions that, when executed by the processing system, cause the processing system to perform operations. The operations include receiving, at a translation device, a conversation from a voice-based communication device. The translation device translates the conversation into a format recognizable by a service provider and then subsequently transmits the translated conversation to the service provider. The operations also include identifying, by the service provider, a relevant portion of the conversation. The operations also include performing, by the service provider, a domain name service based at least partially upon the relevant portion of the conversation to produce domain name service information. The operations also include transmitting the domain name service information from the service provider to the translation device, which translates the domain name service information into a format recognizable by the voice-based communication device and then subsequently transmits the translated domain name service information to the voice-based communication device.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
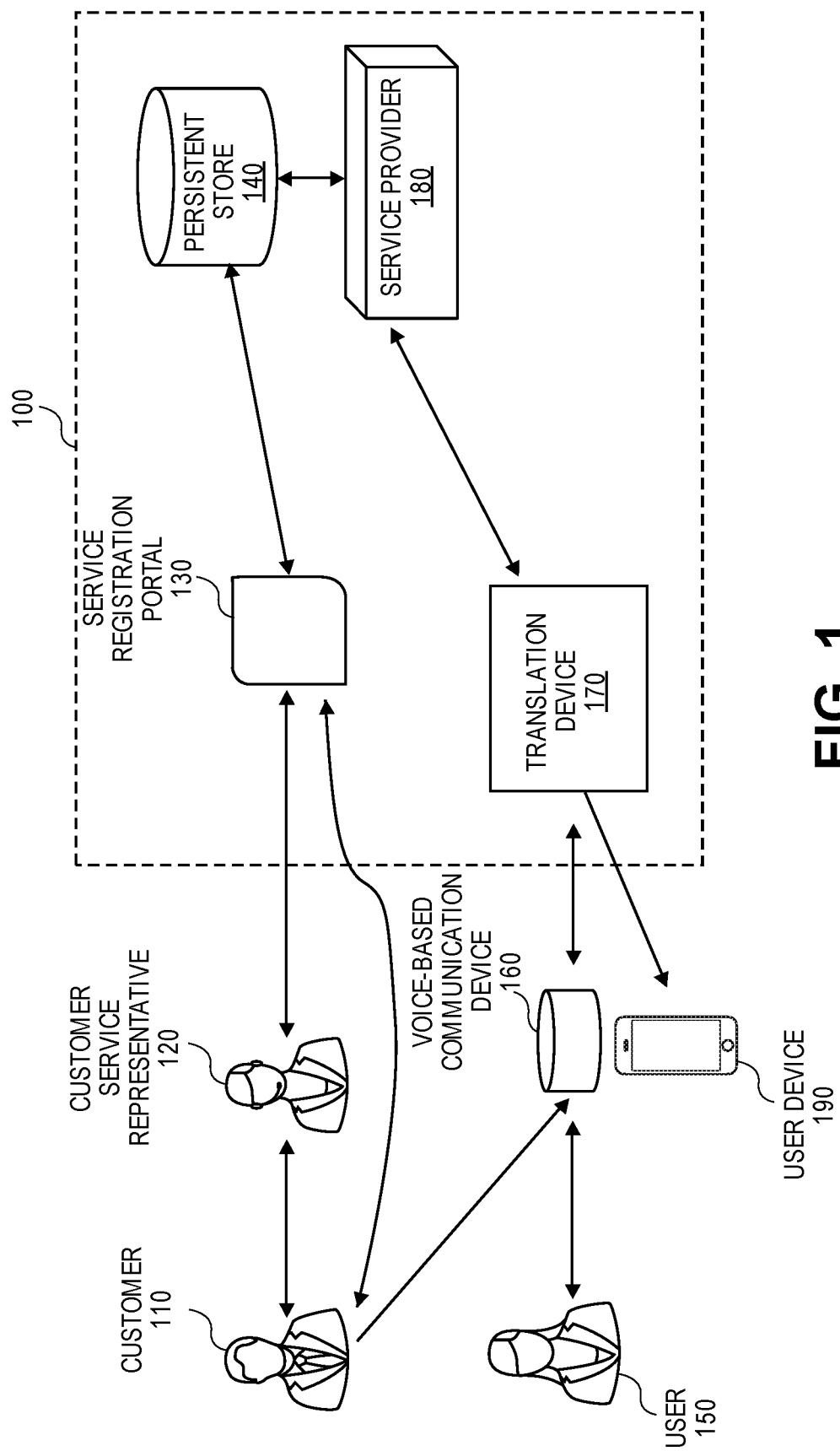
FIG. 1 is a diagram illustrating an example of a system for providing domain name services, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

The present disclosure provides for rules-based automation for a process that was previously done manually. More particularly, the rules-based automation described herein may allow a user to submit domain name service requests audibly rather than manually (e.g., typing) and to receive data or information in response to the domain name service requests audibly and/or visually (e.g., as text on a screen). In addition, the present disclosure adds more to the concept of providing domain name services than mere computer implementation. For example, the present disclosure includes receiving a domain name service request that is submitted audibly by a user, performing a domain name service in response to the domain name service request to produce domain name service information, and transmitting the domain name service information to the user, where the domain name service information is presented audibly and/or visually to the user. Moreover, the present disclosure improves technology in the field of providing domain name services.

Technology has been rapidly evolving in the area of voice-based communication and interaction with smart devices. This opens up doors for new ways to access, store, and retrieve information. Illustrative voice-based communication devices may include Amazon's Alexa (Echo/Echo Dot) and Google Home. Having the capability of interacting with these voice-based communication devices opens new avenues for providing domain name services. Domain name services may be or include providing domain name suggestions, WHOIS data, Registration Data Access Protocol (RDAP), and the like. As used herein "WHOIS data" refers to information related to the entity responsible for a particular domain name or IP address. The WHOIS information may include the entity's name, address, email address, phone number, etc. RDAP is a successor to the WHOIS protocol and refers to a computer network communications protocol used to look up information related to the entity responsible for a particular domain name or IP address. The RDAP data may be similar to or different from the WHOIS data.

FIG. 1 is a diagram illustrating an example of a system 100 for providing domain name services, consistent with certain disclosed embodiments. The system 100 may include a service registration portal 130, a persistent store 140, a translation device 170, and a service provider 180. In general, a customer 110 may communicate with the service registration portal 130, either directly or via a customer service representative 120, to subscribe to voice-based services. Using the service registration portal 130, the customer 110 (e.g., a registrar) may subscribe to the voice-based services provided by the system 100. After registering, the customer 110 may be assigned a unique identifier for future identification purposes. The identifier may be an application programming interface (API) key that is associated with the customer's subscription data. This key may be sent by the customer 110 to the system 100 when accessing a voice-based communication device 160. This will allow the system 100 to customize the responses sent back to the voice-based communication device 160 or a device 190 belonging to the user 150 for consumption. Data describing details of the customer's subscription may be stored by the system 100 (e.g., in the persistent store 140, which may be or include one or more databases).

In various implementations, the key allows the user 150 of the customer 110 to request domain name services from the system 100. More particularly, the user 150 may access the voice-based communication device 160 to request the domain name services. In some embodiments, the request may also include the key. As used herein, "domain name services" may be or include domain name suggestion services (i.e., a service for suggesting domain names that are available to register), WHOIS services, RDAP services, and the like.

The translation device 170 may translate the request received by the voice-based communication device 160 into a format recognizable by the service provider 180, and the service provider 180 may identify and/or provide data or information that is produced, generated, or output by the domain name services in response to the request. For example, the voice-based communication device 160 may receive a voice input from the user 150. This voice input may be converted into a format specific to the voice-based communication device 160, for example, a JSON object with specific fields. The translation device 170 may convert the JSON format into a request that is understandable by the service provider 180, for example, a REST invocation. The process may be reversed while receiving the response. Information corresponding to the key may also be looked-up in the persistent store 140, which may allow the domain name services information to be customized for the customer 110 using the information in the key. Information corresponding to the key may be stored in the persistent store 140 during the customer registration process. The key may be passed to the service provider 180 from the voice-based communication device 160 via the translation device 170. Upon receiving the key, the corresponding information may be looked at in persistent store 140 by the service provider 180.

The customized domain name services information may then be transmitted back to the translation device 170, which may translate the customized domain name services information into a format recognizable by the voice-based communication device 160. The voice-based communication device 160 may then audibly transmit, read, or otherwise present the customized domain name services information to the user 150 and/or electronically transmit the customized domain name services information to a user device 190 (e.g., a computer or smart phone). In some embodiments, the voice-based communication device 160 may also transmit/read/audibly present advertisements to the user. The advertisements may be provided by the service provider 180 and related to the customized domain name services information.

The domain name services information may sometimes include too much information to present to the user 150 at once when the domain name services information is read or otherwise audibly presented to the user by the voice-based communication device 160. When this occurs, the domain name services information may be paginated and cached (e.g., by the translation device 170). In other embodiments, the domain name services information may be persisted, stored, or saved) in the session data between the translation device 170 and the voice-based communication device 160. The translation device 170 may invoke the domain name services information for the first time or when all the cached information has been presented to the user 150. If more than one result is returned by the service provider 180 in response to a domain name service request, the translation device 170 may cache the domain name service responses from the service provider 180 for future requests. For example, if 10 results are returned by the service provider 180 in response to a domain name service request, a predetermined number (e.g., two) may be sent back to user 150 at a time. More can be sent in response to further requests. In this case, the translation service 170 may query the service provider 180 to retrieve all 10 results and provide a smaller set of results to the user 150 at a time until all the results in the cache are exhausted before querying the service provider 180.

In some embodiments, interfaces and/or APIs may be provided from/by the service provider 180 that may be processed, interacted with, or communicated with directly by the voice-based communication device 160. This may allow the translation device 170 to be bypassed or omitted altogether.

Figure 2:
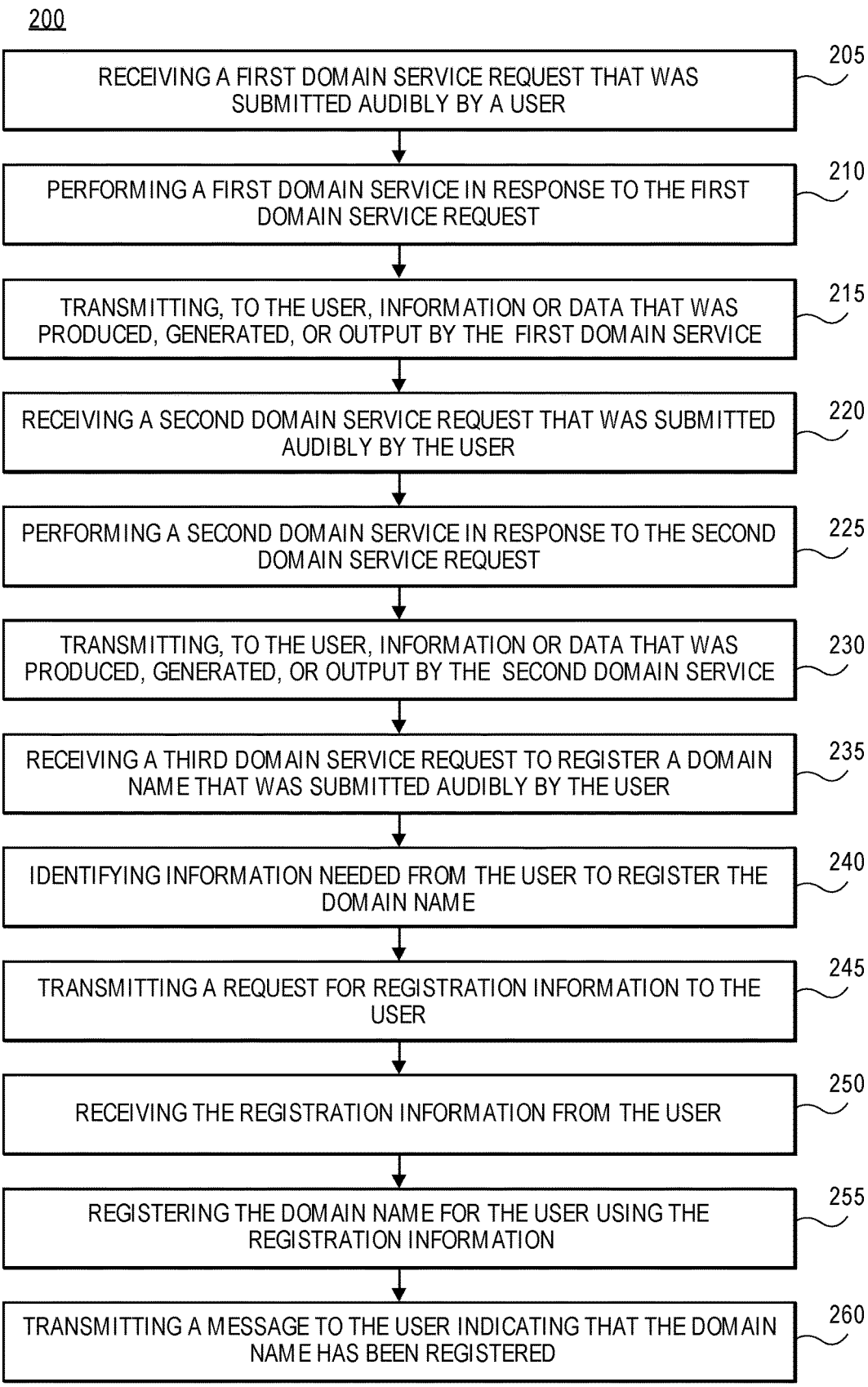
FIG. 2 is a diagram illustrating an example of a flowchart of a process for providing domain name services, consistent with certain disclosed embodiments.

FIG. 2 is a diagram illustrating an example of a flowchart of a process 200 for providing domain name services, consistent with certain disclosed embodiments. In various implementations, the process 200 may be performed by the system 100, as shown in FIG. 1. The process 200 is presented from the perspective of the system 100 (i.e., not the customer 110 or the user 150).

The process 200 begins at operation or stage 205 with receiving a first domain name service request that was submitted audibly by the user 150. For example, the user 150 may audibly ask the voice-based communication device 160 for domain name services (e.g., related to football). The requested domain name services may be or include domain name suggestions related to a subject in general (e.g., football) or related to a particular domain name (e.g., www.football.com). In another example, the requested domain name services may be or include looking up or finding WHOIS data and/or RDAP data related to the subject in general or the particular domain name. In another example, the requested domain name services may be looking up or finding information related to part of, or related to, a particular TLD (e.g., net). In yet another example, the requested domain name services may be looking up or finding information in another language (e.g., related to football, but in Spanish).

The voice-based communication device 160 may receive and interpret the first request and then transmit the first request to the translation device 170. The translation device 170 may translate the first request into a format recognizable by the service provider 180. For example, to be able to integrate or interface with a name suggestion REST API, Amazon's Alexa Lambda functions may be used, or an intermediate translation gateway may be used, to act as a bridge. The translated first request may then be transmitted to the service provider 180.

The process 200 may then include identifying or performing domain name services in response to the (e.g., translated) first request, as at stage 210. Stage 210 may be performed by the system 100 (e.g., by the persistent store 140 and/or the service provider 180). The domain name services may be identified by the interaction from the user 150 (user request). For example, the request may be to check the available domain names, to know who owns an already registered domain, or to register an available domain. The translation device 170 may have a mapping for domain name service (e.g., REST endpoint) to forward the request based on the user request. For example, the domain name services may determine, identify, or indicate that a particular domain name (e.g., football.com) is already registered by a particular entity. The domain name services may also determine, identify, or indicate WHOIS data and/or RDAP data related to the particular entity (e.g., the name, address, email address, phone number, etc.). The domain name services may also or instead determine or provide domain name suggestions related to football that are available for registration, such as best-football.com, the-football.net, and football-us.com. If the requested domain name services are part of, operate on, or are related to a particular TLD (e.g., net), the domain name services may include determining, identifying, or providing domain name suggestions having that TLD, such as best-football.net, the-football.net, and football-us.net. If the requested domain name services include language filtering (e.g., Spanish filtering), the determined or identified domain name suggestions may be at least partially in that language, such as tufootball.com, casafootball.net, and footballverde.com.

The process 200 may then include transmitting information or data that was produced, generated, or output by the domain name services to the user 150 in response to the first request, as at stage 215. This may include transmitting the information output by the domain name services from the service provider 180 to the translation device 170. The translation device 170 may translate the domain name services information into a format recognizable by the voice-based communication device 160. The translation device 170 may then transmit the (e.g., translated) domain name services information to the voice-based communication device 160, which may audibly read or present the domain name services information to the user 150. Instead of, or in addition to, audibly reading the domain name services information to the user 150, the voice-based communication device 160 may transmit the domain name services information to the user's device 190. The voice-based communication device 160 may then ask the user 150 whether the user 150 would like additional domain name services (e.g., additional domain name suggestions).

The process 200 may then include receiving a second request for additional domain name services (e.g., additional domain name suggestions) that was submitted audibly by the user 150, as at stage 220. The process 200 may then include identifying or performing additional domain name services in response to the second request, as at stage 225. The process 200 may then include transmitting information or data that was produced, generated, or output by the additional domain name services to the user 150, as at stage 230. Stages 220, 225, and 230 may be similar to stages 205, 210, and 215, respectively, and are not repeated again in detail. The additional domain name suggestions may include, for example, floris-football.com and school-football.com.

The process may then include receiving a third request for additional domain name services (e.g., to register a domain name) that was submitted audibly by the user 150, as at stage 235. The domain name may be one of the domain names included in the domain name suggestions information provided by the system (e.g., at stage 215 or 230). For example, the user 150 may audibly request to register the domain name best-football.net. The third request may be transmitted to the system 100 in the same manner described above (e.g., at stage 205).

The process 200 may then include identifying information needed from the user 150 to register the domain name in response to the third request, as at stage 240. For example, the voice-based communication device 160 may provide a way to register/link the customer information so that it can be used for certain domain name services (e.g., registering a domain). This information can also be collected from the user 150 at the time of invoking such service via voice prompts or through linked smart device 190. Stage 240 may be performed by the system 100 (e.g., by the persistent store 140 and/or the service provider 180). The information may include name, address, email address, payment information, etc.

The process 200 may then include transmitting a request for the registration information to the user 150, as at stage 245. The request may be transmitted to the user 150 in the same manner described above (e.g., at stage 215).

The process 200 may then include receiving the registration information from the user 150 in response to the request, as at 250. The user 150 may audibly submit the registration information (e.g., by speaking the registration information to the voice-based communication device, as described above), or the user 150 may submit the information using the device 190 (e.g., by typing the registration information).

The process 200 may then include registering the domain name for the user 150 using the registration information provided by the user, as at 255. The domain name may be registered by the system 100 (e.g., by the service provider 180), as is known in the DNS art.

The process 200 may then include transmitting a message and/or other information to the user 150 to indicate that the domain name has been registered, as at 260, which completes the process 200.

In embodiments that include a key as part of the first domain name service request at 205, the key may be used to look up or otherwise identify (e.g., in the persistent store 140) customized information related to or associated with the key. The customized information may be or include information related to the customer (e.g., the registrar) 110 to which the key was assigned. This may allow the domain name services information or the final message to be customized for the particular customer 110. For example, the conclusion message may be customized to thank the user 150 for using the particular customer 110.

Instead of, or in addition to, using the key to customize the domain name services information and/or the message, the first request (e.g., at stage 205) by the user 150 may request the domain name services from a particular customer (e.g., registrar) 110. This may also allow the domain name services and/or the message to be customized for the particular customer 110 and the customer's users 150.

As mentioned above, in some embodiments, the system 100 may transmit advertisements (advertising information) related to the domain name services information. For example, if the first request is related to pizza (e.g., a request for domain name suggestions related to pizza), the domain name services information and/or the message transmitted by the system 100 may include an advertisement or advertising information, such as "Buy a large 2-topping pizza at AAA Pizzeria for $5.99." The advertisement may be read or otherwise presented audibly to the user 150 by the voice-based communication device 160 and/or transmitted to the user's device 190 (e.g., via SMS, email, or other push notifications) for display or audible announcement by the device 190.

In some implementations, the system 100 may have additional functionality to charge the advertiser per advertisement. In addition, by having a pricing model for the customized domain name services information, revenue can be generated using a pay-per-use model or recurring subscription fees. API responses may also contain related advertisements paid for by interested parties. And, anonymized user interest data may be sold to other companies.

Figure 3:
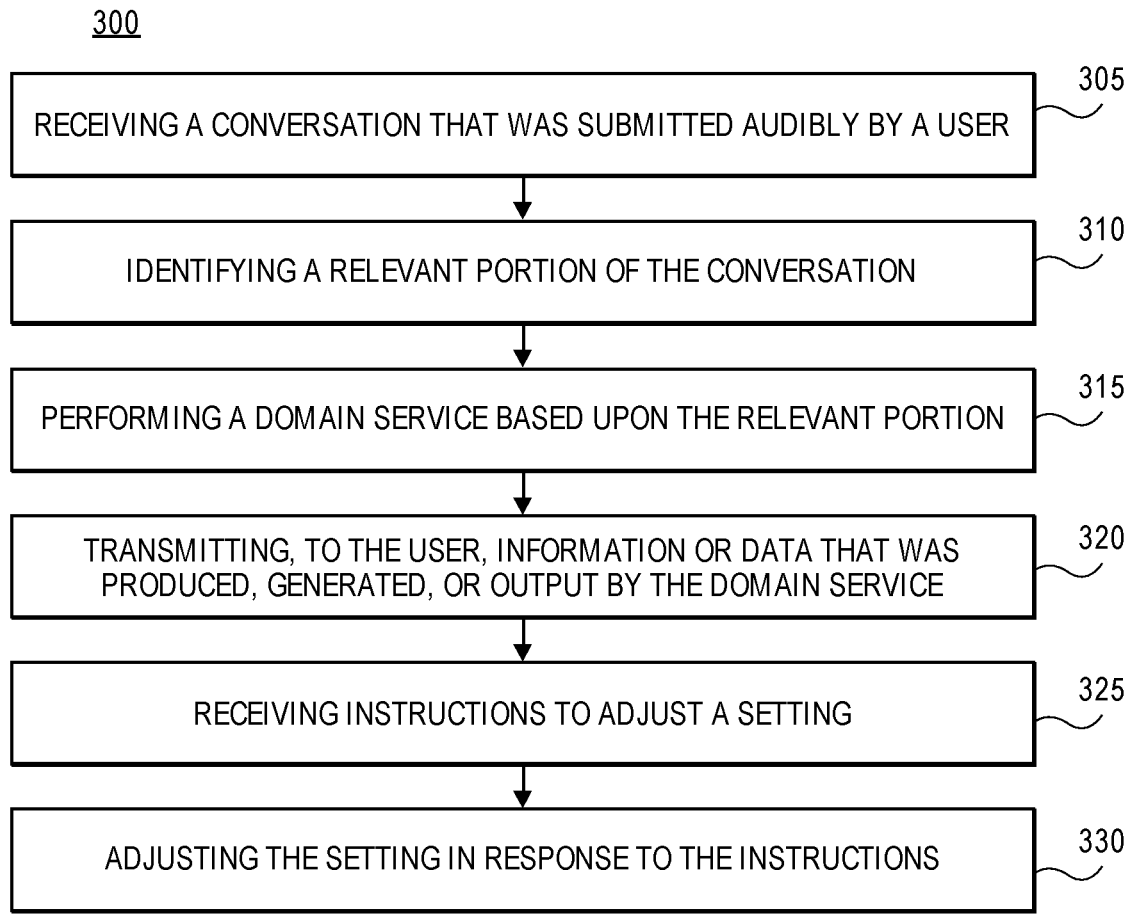
FIG. 3 is a diagram illustrating an example of a flowchart of another process for providing domain name services, consistent with certain disclosed embodiments.

FIG. 3 is a diagram illustrating an example of a flowchart of another process 300 for providing domain name services, consistent with certain disclosed embodiments. In various implementations, the process 300 may be performed by the system 100, as shown in FIG. 1. The process 300 is presented from the perspective of the system 100 (i.e., not the customer 110 or the user 150).

The process 300 begins at operation or stage 305 with receiving a conversation that was submitted audibly by the user 150. In this example, the user 150 may be or include a domainer (as used herein "domainer" refers to a domain investor), a registrar, a domain name reseller, or the like. The user 150 may turn on the voice-based communication device 160 such that the voice-based communication device 160 is configured to listen to and/or record conversations (e.g., by the user 150). In at least one embodiment, the user 150 may set the voice-based communication device 160 into a "name suggestion" mode. At least a portion of the conversations may be related to technical services, solutions, and/or products provided by the user 150; however, at least a portion of the conversations may be unrelated to the technical services, solutions, and/or products provided by the user 150.

The voice-based communication device 160 may listen to and/or record the conversations over an extended period of time (e.g., hours, days, weeks, etc.). The conversations may be listened to and/or recorded during meetings specifically discussing the technical services, solutions, and/or products provided by the user 150, or the conversations may be listened to and/or recorded during the entirety of working hours (e.g., from 8 AM 6 PM).

The voice-based communication device 160 may periodically (e.g., at the end of a meeting, at the end of each day, at the end of each week, etc.) transmit the conversations to the translation device 170 and/or the service provider 180. In another example, the voice-based communication device 160 may transmit the conversations when instructed to do so by the user 150. The voice-based communication device 160 may transmit the conversations to the translation device 170. The translation device 170 may translate the conversations into a format recognizable by the service provider 180. The translated conversations may then be transmitted to the service provider 180.

The process 300 may then include identifying relevant portions of the conversations (e.g., from the conversations as a whole), as at stage 310. Stage 310 may be performed by the system 100 (e.g., by the persistent store 140 and/or the service provider 180). The relevant portions of the conversations may include those portions related to the user's technical services, solutions, and/or products. The relevant portions of the conversations may be identified by generating a list of the words in the conversations that are repeated most frequently. In other embodiments, the relevant portions of the conversations may be identified by utilizing the dictionary (e.g., tokenization), or by not utilizing the dictionary (e.g., one-character tokenization). In yet other embodiments, the relevant portions of the conversations may be identified by breaking the sentences down (e.g., via tokenization) and zone file mapping to identify what relevant domain names have been registered. In yet another embodiment, the sentences may be mapped to vectors that can be decoded to produce domain names. In yet another embodiment, keywords may be extracted from the sentences and run through an algorithm.

The process 300 may then include employing or executing domain name services using, at least partially, the relevant portions of the conversation, as at stage 315. In at least one embodiment, the domain name services may determine, identify, or output domain name suggestions that are based at least partially upon the relevant portions of the conversation. For example, the domain name services may determine, identify, or output one or more domain name suggestions (e.g., for available/unregistered domain names) that are related to the user's technical services, solutions, and/or products, where the suggestions are determined based at least partially upon one or more words that were frequently repeated in the conversation received in stage 305.

Identifying or determining the domain name suggestions from a user's speech may leverage deep neural networks. More particularly, this may include sequence-to-sequence models, consisting of two neural networks, an encoder which processes the speech, and a decoder which generates domain names. The encoder may be a long short-term memory (LSTM) neural network reading the words in the textual transcription of the speech and encoding them into a fixed-length vector. A neural attention mechanism may be used to learn to better focus on relevant parts of the conversation. The decoder may be a character-based LSTM recurrent neural network that decodes the thought vectors to domain name suggestions. With such architecture, it may be possible to generate domain name suggestions from textual data (e.g., speech transcription in this case).

In another embodiment, identifying or determining the domain name suggestions may include identifying, by a processor in the service provider 180, a subset of registered domain names having at least one specified characteristic. For example, the service provider 180 may consider the characteristics and prioritize based on a consolidated ranking. This can be altered by the user 150 by requesting a specific characteristic in the request with specific instructions (e.g., "I'm interested in location specific domains," or "I'm interested in available domains which are receiving traffic already or domains that were registered earlier but are available now."). The system 100 can also extract the context based on the conversation. For example, a real estate company in Virginia may want a localized domain name (e.g., RealEstateVA.com). The at least one specified characteristic may be or include at least one of: a registration history characteristic, a linguistic characteristic, a traffic characteristic, a WHOIS information characteristic, a content characteristic, a geographical characteristic, a routing characteristic, an aftermarket pricing characteristic, a TLD characteristic, or a security characteristic.

Domain name suggestion may provide the ability to receive geo-based suggestions, affix-based suggestions, and/or spinner-based suggestions. This may be leveraged by extracting keywords/named entities from the speech (e.g., any keyword extraction/NER technique may be used), and using these keywords with existing algorithms. For example, relevant keywords may be extracted from speech, such as "movie" and "cinema," and named entities may also be extracted, such as "Andrew" and "New York." Existing name suggestion services may be queried with these words to obtain particular types of suggestions according to user preferences (e.g., affixes, geo, nicknames, etc.). For example, affix-based suggestions may include "ActionMovie.com," "MovieTheatre.com," and "MovieFestivalOnline.com," and geo-based suggestions may include "AmericanCinema.com" and "NY-Movie.com."

In another embodiment, the domain name services may be or include services that find or identify and return WHOIS data and/or RDAP data that contains or is otherwise related to words or information that are in the relevant portions of the conversation, from stage 310. For example, the domain name services may find WHOIS data and/or RDAP data (e.g., from a WHOIS and/or RDAP database) for one or more domain names that are already registered and that are related to the user's technical services, solutions, and/or products, where the relationship is determined based at least partially upon one or more words that are frequently repeated in the conversation. For example, the service may identify and return certain WHOIS data because it contains one or more words that are frequently repeated in the conversation.

In at least one embodiment, the conversation received at stage 305 may also include geographic data related to the location of the user 150, and the domain name services may return outputs that are based at least partially upon the location of the user. In another embodiment, the domain name services may include a service that generates or determines a ranking or score (e.g., 95 out of 100) that indicates how similar the outputted domain name services information is to the relevant portions of the conversation.

The process 300 may then include transmitting, to the user 150, information or data that was produced, generated, or output by the domain name service, as at stage 320. The domain name services information may be identified, generated, or otherwise determined and transmitted periodically (e.g., once per day, once per week, etc.), and may be based upon the conversations that are received by the system 100 during that time period. Transmitting the domain name services information may include transmitting the domain name services information from the service provider 180 to the translation device 170. The translation device 170 may translate the domain name services information into a format recognizable by the voice-based communication device 160 in the same manner as described above. The translation device 170 may then transmit the (e.g., translated) domain name services information to the voice-based communication device 160, which may audibly read or otherwise audibly present the domain name services information to the user 150. Instead of, or in addition to, audibly reading the domain name services information to the user 150, the voice-based communication device 160 may transmit the domain name services to the user's device 190 for display or audio presentation.

The process 300 may then include receiving instructions to adjust settings of the domain name service(s) at the service provider 180 after the domain name services information is transmitted to the user 150, as at stage 325. The process 300 may then include adjusting the settings in response to the instructions, as at stage 330. In various embodiments, adjusting the settings may include identifying one or more words in the conversations and/or the domain name services information (e.g., the domain name suggestions) that are unrelated to the user's technical services, solutions, and/or products, such that the information output by the domain name service is not based on the identified, unrelated words. For example, natural language processing, machine (deep) learning, and other artificial intelligence and text processing methods can be utilized to extract the relevant content from the conversation. In various embodiments, adjusting the settings may include adjusting a frequency at which the domain name services are executed and at which the domain name services information is transmitted to the user 150 (e.g., once per day, once per week, etc.). The frequency may be provided by the service provider 180, but the frequency may be changed by the user 150.

Figure 4:
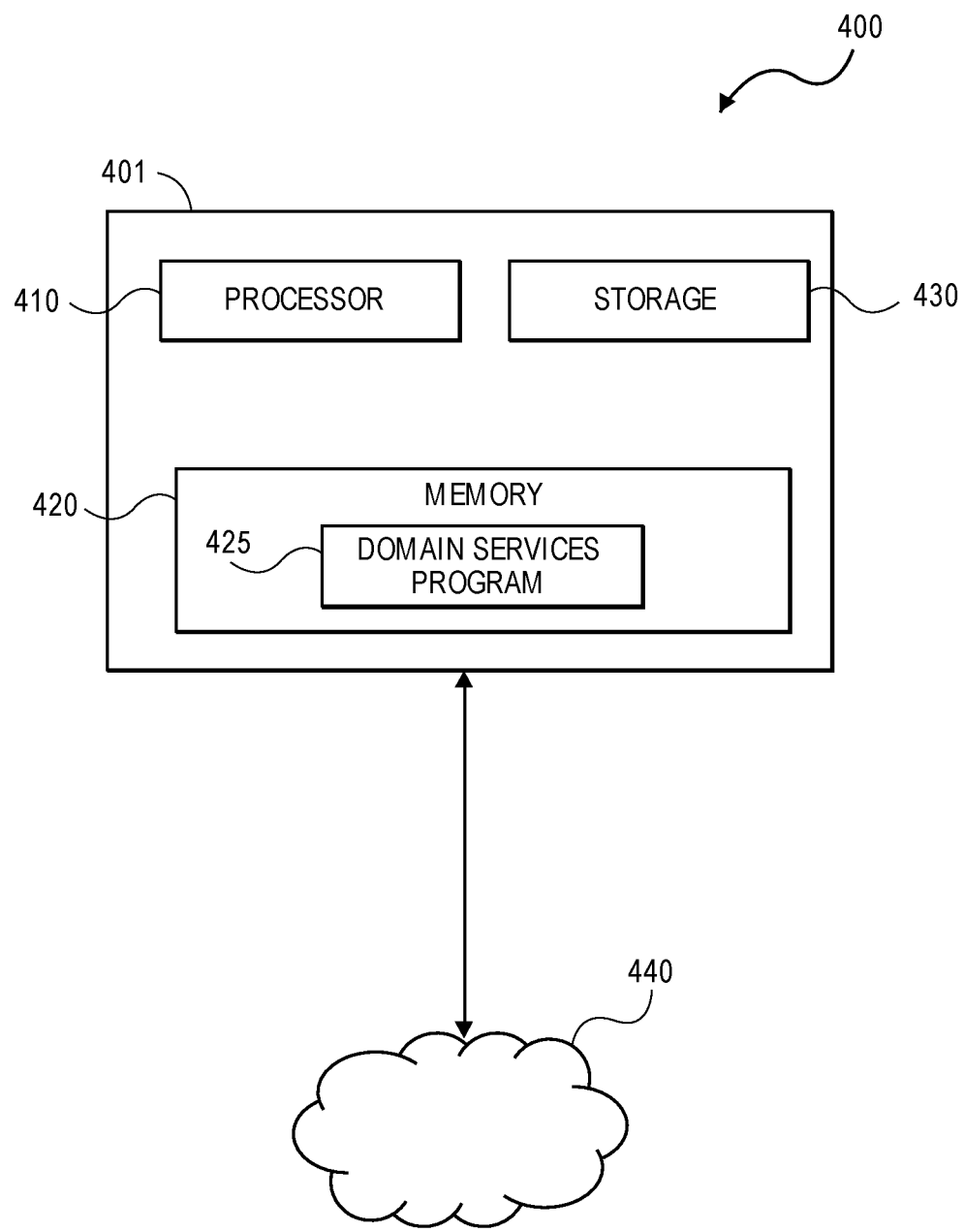
FIG. 4 is a diagram illustrating an example of a hardware system for performing at least a portion of one or more of the methods disclosed herein, consistent with certain disclosed embodiments.

FIG. 4 is a diagram illustrating an example of a hardware system 400 for performing at least a portion of one or more of the methods 200, 300 disclosed herein, consistent with certain disclosed embodiments. The example of a hardware system 400 includes examples of system components that may be used. The components and arrangement, however, may be varied.

As the example of FIG. 4 shows, the hardware system 400 may include a computer 401. The computer 401 may include a processor 410, a memory 420, a storage 430, and input/output (I/O) devices (not pictured). The computer 401 may be implemented in various ways and can be configured to perform any of the embodiments described above. In some embodiments, the computer 401 can be a general-purpose computer such as, for example, a desktop computer, a laptop, a tablet device, a mobile device (e.g., a smartphone), etc. In other embodiments, the computer 401 can be a more capable computing device such as, for example, a data base server (e.g., a domain name registry), a web server, a mainframe computer, etc. The computer 401 may be stand-alone or may be part of a subsystem, which may, in turn, be part of a larger system. For example, the computer 401 can be at least a portion of the system 100 (e.g., the persistent store 140, the translation device 170, and/or the service provider 180).

The processor 410 may include one or more known processing devices, such as a microprocessor from the Intel Core™ family manufactured by Intel™, the Phenom™ family manufactured by AMD™, or the like. The memory 420 may include one or more storage devices configured to store information and/or instructions used or executed by the processor 410 to perform certain functions and operations related to the disclosed embodiments. The storage 430 may include a volatile or non-volatile, magnetic, semiconductor, tape, optical, removable, non-removable, or other type of computer-readable medium used as a storage device. In some embodiments, the storage 430 can include or contain, for example, the data received by the persistent store 140.

[53] In an embodiment, the memory 420 may include one or more programs or subprograms including instructions that may be loaded from the storage 430 or elsewhere that, when executed by the processor 410 of the computer 401, perform various procedures, operations, stages, or processes consistent with disclosed embodiments. For example, the memory 420 may include a domain name services program 425 for performing at least a portion of the method 200, and/or the method 300. The memory 420 may also include other programs that perform other functions, operations, and processes, such as programs that provide communication support, Internet access, etc. The domain name services program 425 may be embodied as a single program, or alternatively, may include multiple sub-programs that, when executed, operate together to perform the function of the domain name services program 425 according to disclosed embodiments.

The computer 401 may communicate over a link with a network 440 to, for example, a DNS registry, a DNS registrar, a voice-based communication device 160, etc. For example, the link may be a direct communication link, a local area network (LAN), a wide area network (WAN), or other suitable connection. The network 440 may include the internet, as well as other networks, which may be connected to various systems and devices.

The computer 401 may include one or more input/output (I/O) devices (not pictured) that allow data (information) to be received and/or transmitted by the computer 401. The I/O devices may also include one or more digital and/or analog communication I/O devices that allow the computer 401 to communicate with other machines and devices. The I/O devices may also include input devices such as a keyboard or a mouse, and may include output devices such as a display or a printer. The computer 401 may receive data (e.g., domain name service requests, registration information, conversations, etc.) from external machines and devices and output data (e.g., domain name services information) to external machines and devices via I/O devices. The configuration and number of input and/or output devices incorporated in I/O devices may vary as appropriate for various embodiments. Example uses of the hardware system 400 can be described by way of example with reference to the embodiments described above.

While the teachings have been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system for providing domain name services, the system comprising:

a processing system comprising one or more processors for a translation device; and a memory system comprising one or more computer-readable media, wherein the one or more computer-readable media contain instructions that, when executed by the processing system, cause the processing system to perform operations comprising:

receiving, at the translation device, a first request in a first format from a voice-based communication device that receives the first request, wherein the first request comprises an audible request;

determining, based on the first request, the first request is for a first domain name service, wherein the translation device is configured to translate the first request into a second format recognizable by a domain name service provider of the first domain name service, wherein the first domain name service comprises a service related to domain name registration and availability information, and wherein the translation device is configured to transmit the translated first request to the domain name service provider;

receiving, from the domain name service provider, a first domain name service information that was produced by the first domain name service in response to the translated first request, wherein the translation device is configured to translate the first domain name service information into the first format recognizable by the voice-based communication device;

transmitting the translated first domain name service information to the voice-based communication device;

receiving, at the translation device, a second request in the first format from the voice-based communication device that receives the second request; and determining, based on the second request, the second request is for a second domain name service, wherein the translation device is configured to translate the second request into the second format recognizable by a second domain name service provider of the second domain name service, and wherein the translation device is configured to transmit the translated second request to the second domain name service provider.

2. The system of claim 1, wherein the first request is limited to a top level domain.

3. The system of claim 1, wherein the first request is for WHOIS data related to a domain name.

4. The system of claim 3, wherein the first domain name service information comprises an advertisement related to the domain name.

5. The system of claim 1, wherein the first request is for suggestions for available domain names that are related to a subject.

6. The system of claim 5, wherein the second request is for registering a domain name of the available domain names in response to the translated first domain name service information.

7. The system of claim 6, wherein the operations further comprise:
receiving, at the translation device, a request for registration information from the domain name service provider, wherein the translation device translates the request for registration information into the first format recognizable by the voice-based communication device, wherein the translation device subsequently transmits the translated request for registration information to the voice-based communication device; and
receiving, at the translation device, the registration information from the voice-based communication device in response to the translated request for registration information, wherein the translation device translates the registration information into the second format recognizable by the domain name service provider, wherein the translation device subsequently transmits the translated registration information to the domain name service provider.

8. The system of claim 1, wherein the first request comprises a key that identifies a registrar, and wherein the first domain name service information is customized based at least partially upon information related to the key.

9. The system of claim 1, wherein the translated first domain name service information is paginated and cached by the translation device after a predetermined amount of time for the voice-based communications device to audibly present the translated first domain name service information to a user.

10. The system of claim 1, wherein the translated first domain name service information is also transmitted to a device of a user after a predetermined amount of time for the voice-based communications device to audibly present the translated first domain name service to a user.

11. The system of claim 1, wherein the first format comprises a JSON format, and wherein the second format comprises a representational state transfer format.

12. The system of claim 1, wherein the first domain name service information comprises domain name suggestion, domain name registration, and/or domain name availability information.

13. The system of claim 1, wherein the service related to domain name registration and availability information comprises a domain name suggestion service.

14. A system for providing domain name services, the system comprising:
a processing system comprising one or more processors; and
a memory system comprising one or more computer-readable media, wherein the one or more computer-readable media contain instructions that, when executed by the processing system, cause the processing system to perform operations comprising:
receiving, at a translation device, a conversation from a voice-based communication device in a first format;
determining, based on the conversation, the conversation comprises a first request for a first domain name service, wherein the translation device is configured to translate the conversation into a second format recognizable by a domain name service provider of the first domain name service, wherein the first domain name service comprises a service related to domain name registration and availability information, and wherein the translation device is configured to transmit the translated conversation to the domain name service provider;
identifying, by the domain name service provider, a relevant portion of the conversation;
performing, by the domain name service provider, a first domain name service based at least partially upon the relevant portion of the conversation to produce a first domain name service information;
transmitting the first domain name service information from the domain name service provider to the translation device, wherein the translation device is configured to translate the first domain name service information into the first format recognizable by the voice-based communication device; and
transmitting the translated first domain name service information to the voice-based communication device; and
determining, based on the conversation, the conversation comprises a second request for a second domain name service, wherein the translation device is configured to translate the conversation into the second format recognizable by a second domain name service provider of the second domain name service, and wherein the translation device is configured to transmit the translated conversation to the second domain name service provider.

15. The system of claim 14, wherein the conversation is recorded over a period of days.

16. The system of claim 14, wherein the relevant portion of the conversation is related to technical services, solutions, or products provided by a user.

17. The system of claim 16, wherein the first domain name service information comprises WHOIS data based upon the relevant portion of the conversation.

18. The system of claim 16, wherein the first domain name service information comprises one or more domain name suggestions based upon the relevant portion of the conversation.

19. The system of claim 18, wherein the first domain name service information comprises a plurality of domain name suggestions, and further comprising generating a score for each of the domain name suggestions corresponding to how similar each of the domain name suggestions is to the relevant portion of the conversation.

20. The system of claim 18, wherein receiving the conversation comprises receiving a plurality of conversations periodically, and wherein the first domain name service is updated in response to receiving new ones of the plurality of conversations.

21. The system of claim 20, wherein the operations further comprise adjusting a setting after the translated first domain name service information is transmitted.

22. The system of claim 21, wherein adjusting the setting comprises identifying one or more words in the conversation that are not relevant.

23. The system of claim 21, wherein adjusting the setting comprises adjusting a frequency at which the first domain name service information is transmitted after the domain name service is updated.

\* \* \* \* \*